United States Patent [19]
Siegler et al.

[11] 3,933,704
[45] Jan. 20, 1976

[54] MANUFACTURE OF WOOD MATERIALS CONTAINING WOOD PROTECTANT

[75] Inventors: Manfred Siegler, Frankenthal; Otto Froede, Ludwigshafen, both of Germany

[73] Assignee: BASF Aktiengesellschaft, Ludwigshafen (Rhine), Germany

[22] Filed: Oct. 17, 1974

[21] Appl. No.: 515,551

[30] Foreign Application Priority Data
Oct. 17, 1973 Germany.............................. 2352052

[52] U.S. Cl................................ 260/17.2; 260/17.3
[51] Int. Cl.$^2$......................................... C08L 1/00
[58] Field of Search........................... 260/17.2, 17.3

[56] References Cited
UNITED STATES PATENTS
3,297,603  1/1967  Mase.................................. 260/17.3
3,410,813  11/1968  Campbell et al................... 260/17.2
3,651,006  3/1972  Sander et al....................... 260/33.2

OTHER PUBLICATIONS

Chem. Abst., Vol. 78 (1973) 107006u, Richardson, Timber Preservation Composition.

Primary Examiner—Harold D. Anderson
Assistant Examiner—Edward Woodberry
Attorney, Agent, or Firm—Johnston, Keil, Thompson & Shurtleff

[57] ABSTRACT

Incorporation of wood protectants into materials produced by bonding wood particles and containing water repellents by blending the wood protectants with the water repellents.

2 Claims, No Drawings

MANUFACTURE OF WOOD MATERIALS CONTAINING WOOD PROTECTANT

This application discloses and claims subject matter described in German Patent Application No. P 23 52 052.7, filed 17 Oct. 1973, which is incorporated herein by reference.

Chipboard and other wood materials containing wood particles and binders are subject to attack by fungi and pests in the same manner as solid wood.

For this reason, they are always treated with wood protectants whenever such attack is to be expected.

Whereas the protection of solid wood is usually limited to external treatment with wood protectants, thorough protection of wood materials composed of wood particles and binders is obtained, in principle, by applying the wood protectants to the particulate wood components or adding them to the binder before or during manufacture of the wood material.

However, both methods have drawbacks. Many wood protectants show poor compatibility with the binders and interfere with the bonding process irrespective of their method of incorporation. This leads, for example, to insufficient strength and swelling resistance of the resulting wood materials.

It is known to add water repellents to wood materials during their manufacture to improve the swelling properties thereof. Commonly used agents of this kind are paraffin emulsions.

It is an object of the invention to provide a process in which the normally only slightly water-soluble wood protectants may be incorporated into the wood material in a more efficient manner.

It is another object of the invention to provide a process giving hydrophobic wood particle-based materials bonded by a conventional phenoplastic or aminoplastic binder and exhibiting improved water resistance and improved resistance to both fungal and animal attack.

It is yet another object of the invention to provide improved chipboards by mixing together and bonding the following ingredients: wood particles or wood chips, a binder selected from the group comprising phenol/formaldehyde resins and amino resins such as urea, urea/melamine and melamine/formaldehyde resins, a water repellent and a wood protectant.

We have found that wood materials obtained by bonding particulate wood components with binders with the addition of water repellents may be treated with wood protectants in a particularly advantageous manner if the wood protectants are added to the water repellents.

When mainly paraffin emulsions are used as water repellents, it has been found particularly advantageous to blend the wood protectant with a suitable paraffin or wax material, which is then emulsified. It is clearly important to ensure that the wood protectant is enclosed in the water repellent during incorporation into the wood material to prevent interaction thereof with the glue used. Since the water repellent usually melts during the manufacture of the wood material, the wood protectant will be distributed throughout the wood material together with the water repellent.

This result is surprising, since impartial consideration of the matter would lead one to assume that the water repellent would, in enclosing the wood protectant, reduce the activity of the latter.

However, not only a particularly good and uniform action of the wood protectant is to be found, but tests have shown that specific wood protectants, e.g. the well-known sodium salt of N-nitroso-N-cyclohexylhydroxylamine, have a favorable effect on the activity of the water repellent. It is remarkable that the swelling of chipboard in which the water repellent added during manufacture contains N-nitroso-N-cyclohexylhydroxylamine would seem to be distinctly less than that of chipboard which has not been prepared in the manner of the invention.

Other suitable wood protectants for use in the present invention are for example potassium hydrogen fluoride, copper compounds and their soluble complexes, and boron compounds, i.e. organic compounds containing copper, boron or arsenic.

The wood protectants are generally applied at a rate of from 0./ to 10% and in particular from 0.2 to 5%, based on the weight of the material being treated. It will be appreciated that the amount necessary depends on the nature of the wood protectant, the type of wood, the wood glue used and other factors.

Preferred water repellents are emulsions of paraffin or degraded polyethylenes having a hydrocarbon content of from, say, 30 to 70 %. Emulsifiers generally used are alkali-compatible soaps, sulfonates, tallow oil preparations and ammonia.

Suitable binders for the manufacture of wood materials treated in the manner of the invention are also well known. In large-scale industrial work, use will be made of, for example, phenoplastic binders, particularly highly alkaline phenol resins, and aminoplastic binders, particularly urea, melamine and urea/melamine resins. In some cases, use is made of the so-called white glues, i.e. dispersions based on vinyl polymers, but these are quantitatively of minor significance.

The process of the invention is equally applicable to all bonding processes of the type under consideration, in which the said binders are used in conjunction with water repellents.

EXAMPLE 100 parts by weight of paraffin (melting range 60°C) were melted and 27 parts of the sodium salt of N-nitroso-N-cyclohexylhydroxylamine were blended with the melt. 30.8 parts of an emulsifier (RS 4907 by Henkel, Duesseldorf) as used commercially for the preparation of alkali-resistant paraffin emulsions were added to the melt and the whole was then emulsified in 160 parts by weight of water.

120 parts of this emulsion were mixed with 667 parts of a 48% solids phenol resin solution and 40 parts by weight of a hardener for the resin.

COMPARATIVE EXAMPLE A

To 667 parts of the same phenol resin solution as used in the Example there were added 80 parts of a conventional 50% paraffin emulsion and 40 parts of hardener. 43 parts of a wood protectant containing the active ingredient used in the Example in a concentration of 25% were also added to this mixture. This gave the same proportions of phenol resin and active wood protectant as in the Example.

COMPARATIVE EXAMPLE B

To 667 parts by weight of the same phenol resin solution as used in the Example there were added 80 parts by weight of a 50% paraffin emulsion and 40 parts by weight of hardener.

Comparison of the Example with the Comparative Examples

Pine chips were treated with the glue mixture described in the Example in such a manner that 8% of phenol resin and 1% of paraffin were applied, based on the weight of the bone-dry chips. In the case of the glue mixture of the Example and Comparative Example A this means an addition of 0.27% of rot-proofing active ingredient. The glued chips were then pressed in a heated hydraulic press at 165°C for 6 minutes to form chipboard having a thickness of about 19 mm. The chipboard specimens have the following properties:

|  | Example | Comp.Ex. A | Comp.Ex. B |
|---|---|---|---|
| thickness after sanding (mm) | 17.8 | 17.7 | 17.8 |
| density (g/cm$^3$) | 0.622 | 0.616 | 0.659 |
| flexural strength (kg/cm$^2$) | 332 | 333 | 300 |
| transverse tensile strength |  |  |  |
|    dry (kg/cm$^2$) | 8.8 | 7.7 | 6.6 |
|    after 2 hrs at the boil (kg/cm$^2$) | 2.9 | 2.7 | 2.8 |
| degree of swell (board thickness) |  |  |  |
|    after 2 hrs (%) | 7.9 | 11.5 | 10.6 |
|    after 24 hrs (%) | 16.4 | 17.2 | 18.9 |
| fungal resistance |  |  |  |
| (a) mildew |  |  |  |
|    aspergillus niger |  |  |  |
|    fungal growth on: |  |  |  |
|      specimen | − | − | +++ |
|      agar-agar | +++ | +++ | +++ |
|      areola formation around specimen | 10 mm | 5 mm | − |
|    trichoderma viride |  |  |  |
|    fungal growth on: |  |  |  |
|      specimen | − | − | +++ |
|      agar-agar | ++ | +++ | +++ |
|      areola formation | 10 mm | 8 mm | − |
| (b) wood-rot |  |  |  |
|    coniophora cerebella |  |  |  |
|    fungal growth on specimen | − | − | + |

Legend: the minus sign (−) denotes no fungal growth; the plus signs (+, ++, +++) denote progressive stages of fungal growth on specimen or agar-agar ranging up to complete coverage.

We claim:
1. In an improved process for the production of waterproof chipboard which also contains wood protectants by mixing wood chips, a binder selected from the group consisting of alkaline phenol formaldehyde resins, urea/formaldehyde resins, melamine/formaldehyde resins and urea/melamine/formaldehyde resins, a water repellent and a wood protectant and heating under pressure, the improvement which consists in blending together molten paraffin as the water repellent and the sodium salt of N-nitroso-N-cyclohexylhydroxylamine as the wood protectant, emulsifying the blend in water, mixing the emulsion with the wood chips and binder and curing the resultant blend under heat and pressure.

2. A process as claimed in claim 1 wherein said wood protectant is used in an amount of 0.1 to 10% by weight, based on the weight of the chipboard.

\* \* \* \* \*